United States Patent
Sugano

(10) Patent No.: US 9,807,084 B2
(45) Date of Patent: Oct. 31, 2017

(54) INFORMATION PROCESSING APPARATUS AND ENCRYPTION COMMUNICATING METHOD

(71) Applicant: CANON KABUSHIKI KAISHA, Tokyo (JP)

(72) Inventor: Yasuharu Sugano, Obu (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 14/789,091

(22) Filed: Jul. 1, 2015

(65) Prior Publication Data

US 2016/0021110 A1    Jan. 21, 2016

(30) Foreign Application Priority Data

Jul. 16, 2014  (JP) ................................ 2014-146030

(51) Int. Cl.
*H04L 29/06* (2006.01)

(52) U.S. Cl.
CPC ........ H04L 63/0823 (2013.01); H04L 63/166 (2013.01); H04L 63/20 (2013.01)

(58) Field of Classification Search
CPC .... H04L 63/0823; H04L 63/166; H04L 63/20
USPC ....................................................... 713/156
See application file for complete search history.

(56) References Cited

U.S. PATENT DOCUMENTS

| | | | |
|---|---|---|---|
| 8,810,864 B2 | 8/2014 | Sugano | |
| 2003/0041263 A1* | 2/2003 | Devine | G06F 11/0709 726/4 |
| 2005/0047597 A1* | 3/2005 | Zheng | H04W 12/02 380/247 |
| 2006/0204003 A1* | 9/2006 | Takata | H04L 9/083 380/30 |
| 2016/0029211 A1* | 1/2016 | Furuta | H04L 9/088 380/270 |

FOREIGN PATENT DOCUMENTS

JP    2009094676 A    4/2009

OTHER PUBLICATIONS

Barker, E., et al., NIST Special Publication 800-57, "Recommendation for Key Management—Part 1: General (Revised)", Computer Security, Mar. 2007. [Previously available at: http://csrc.nist.gov/publications/nistpubs/800-57/sp800-57-part1-revised2_Mar08-2007.pdf].

Barker, E., et al., NIST Special Publication 800-57, "Recommendation for Key Management—Part 1: General (Revised)", Computer Security, Jul. 2012. [Currently available at: http://csrc.nist.gov/publications/nistpubs/800-57/sp800-57_part1_rev3_general.pdf].

* cited by examiner

Primary Examiner — Michael S McNally
(74) Attorney, Agent, or Firm — Fitzpatrick, Cella, Harper & Scinto

(57) ABSTRACT

An information processing apparatus for performing encryption communication with an external apparatus by an encryption communication protocol has an inhibition unit for inhibiting use of a set of algorithms which do not satisfy a predetermined condition among a plurality of sets of algorithms used in the encryption communication protocol. The set of algorithms whose use if inhibited is a set of algorithms which need to transmit a message with a signature of the information processing apparatus to the external apparatus at the time of handshake performed with the external apparatus prior to the encryption communication.

19 Claims, 16 Drawing Sheets

FIG. 3

| FIELD | | EXAMPLE |
|---|---|---|
| version | | v3 |
| serialNumber | | 01 |
| signature | | sha256RSA |
| issuer | | C=JP, O=XXX |
| validity | notBefore | 1/1/2014 12:00:00 |
| | notAfter | 1/1/2015 12:00:00 |
| subject | | C=JP, O=XXX |
| subjectPublicKeyInfo | | RSA (2048bit) |
| signatureAlgorithm | | sha256RSA |
| signature | | 8152···8153 |

FIG. 12A

| CipherSuite | SETTING FOR INHIBITING USE OF WEAK CIPHER | |
| --- | --- | --- |
| | OFF | ON |
| TLS_ECDHE_RSA_WITH_AES_256_CBC_SHA384 | ○ | × |
| TLS_ECDHE_RSA_WITH_AES_256_CBC_SHA | ○ | × |
| TLS_ECDHE_RSA_WITH_AES_128_GCM_SHA256 | ○ | × |
| TLS_ECDHE_RSA_WITH_AES_256_GCM_SHA384 | ○ | × |
| TLS_ECDHE_ECDSA_WITH_AES_256_CBC_SHA384 | ○ | × |
| TLS_ECDHE_ECDSA_WITH_AES_256_CBC_SHA | ○ | × |
| TLS_ECDHE_ECDSA_WITH_AES_128_GCM_SHA256 | ○ | × |
| TLS_ECDHE_ECDSA_WITH_AES_256_GCM_SHA384 | ○ | × |
| TLS_ECDHE_RSA_WITH_AES_128_CBC_SHA256 | ○ | × |
| TLS_ECDHE_RSA_WITH_AES_128_CBC_SHA | ○ | × |
| TLS_ECDHE_ECDSA_WITH_AES_128_CBC_SHA256 | ○ | × |
| TLS_ECDHE_ECDSA_WITH_AES_128_CBC_SHA | ○ | × |
| TLS_RSA_WITH_AES_256_CBC_SHA256 | ○ | ○ |
| TLS_RSA_WITH_AES_256_CBC_SHA | ○ | ○ |
| TLS_RSA_WITH_AES_128_CBC_SHA256 | ○ | ○ |
| TLS_RSA_WITH_AES_128_CBC_SHA | ○ | ○ |
| TLS_RSA_WITH_3DES_EDE_CBC_SHA | ○ | ○ |
| TLS_RSA_WITH_RC4_128_SHA | ○ | × |
| TLS_RSA_WITH_RC4_128_MD5 | ○ | × |

FIG. 12B

| CipherSuite | SETTING FOR INHIBITING USE OF WEAK CIPHER | |
|---|---|---|
| | OFF | ON |
| TLS_ECDHE_RSA_WITH_AES_256_CBC_SHA384 | O | O |
| TLS_ECDHE_RSA_WITH_AES_256_CBC_SHA | O | O |
| TLS_ECDHE_RSA_WITH_AES_128_GCM_SHA256 | O | O |
| TLS_ECDHE_RSA_WITH_AES_256_GCM_SHA384 | O | O |
| TLS_ECDHE_ECDSA_WITH_AES_256_CBC_SHA384 | O | O |
| TLS_ECDHE_ECDSA_WITH_AES_256_CBC_SHA | O | O |
| TLS_ECDHE_ECDSA_WITH_AES_128_GCM_SHA256 | O | O |
| TLS_ECDHE_ECDSA_WITH_AES_256_GCM_SHA384 | O | O |
| TLS_ECDHE_RSA_WITH_AES_128_CBC_SHA256 | O | O |
| TLS_ECDHE_RSA_WITH_AES_128_CBC_SHA | O | O |
| TLS_ECDHE_ECDSA_WITH_AES_128_CBC_SHA256 | O | O |
| TLS_ECDHE_ECDSA_WITH_AES_128_CBC_SHA | O | O |
| TLS_RSA_WITH_AES_256_CBC_SHA256 | O | O |
| TLS_RSA_WITH_AES_256_CBC_SHA | O | O |
| TLS_RSA_WITH_AES_128_CBC_SHA256 | O | O |
| TLS_RSA_WITH_AES_128_CBC_SHA | O | O |
| TLS_RSA_WITH_3DES_EDE_CBC_SHA | O | O |
| TLS_RSA_WITH_RC4_128_SHA | O | × |
| TLS_RSA_WITH_RC4_128_MD5 | O | × |

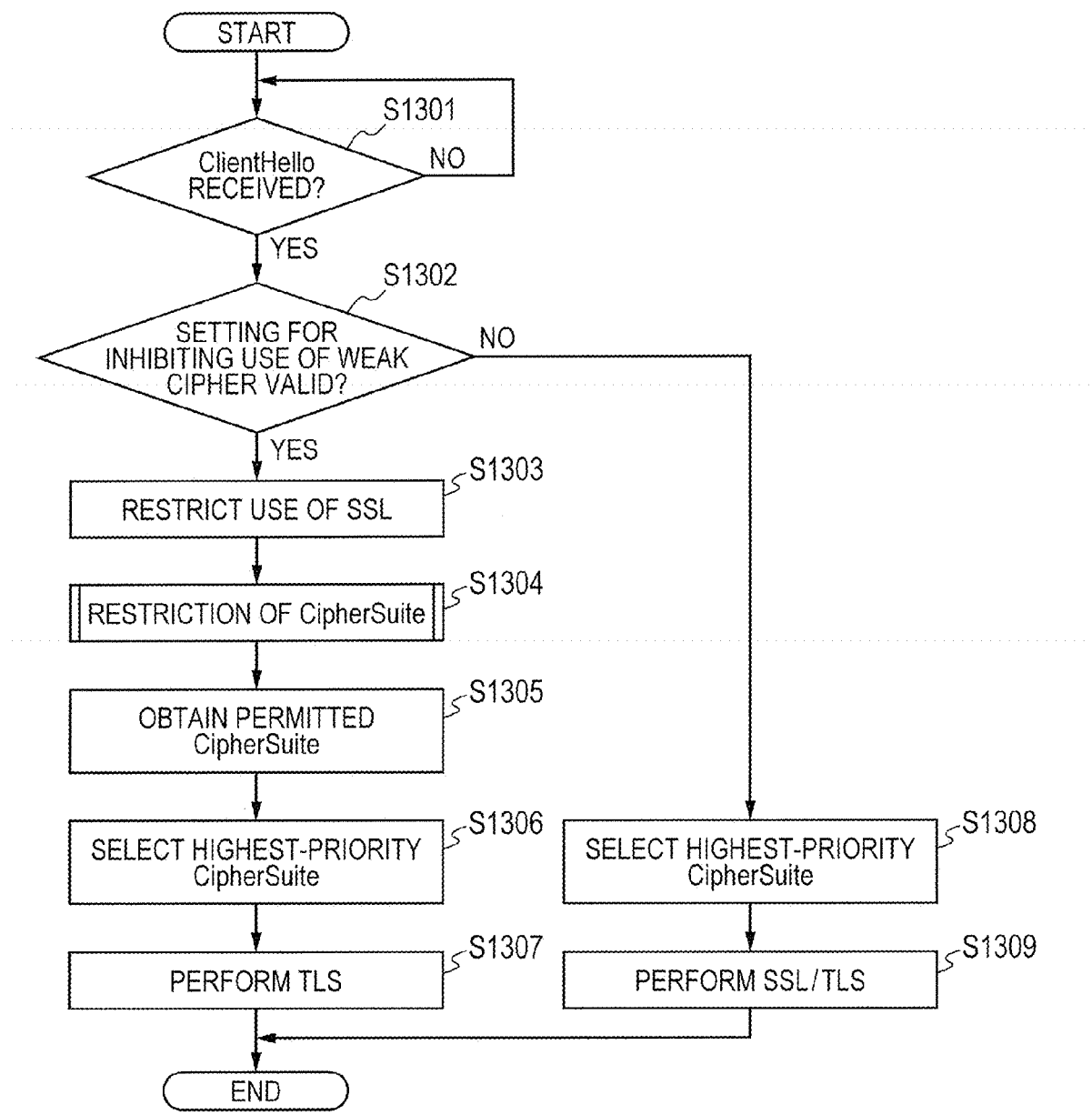

INFORMATION PROCESSING APPARATUS AND ENCRYPTION COMMUNICATING METHOD

BACKGROUND OF THE INVENTION

Field of the Invention

The present invention relates to an information processing apparatus, an encryption communicating method, and a program and, more particularly, is suitable when it is used to perform, encryption communication.

Description of the Related Art

Many information apparatuses have an encryption communicating function. By performing encryption communication between an information apparatus on a transmission side and an information apparatus on a reception side, a leakage of security information on a network can be prevented. As techniques regarding an algorithm which is used for encryption of communication, Japanese Patent Application Laid-Open No. 2009-94676, NIST, "Recommendation for Key Management: Part 1: General", 2007, March, and Internet <URL:http://csrc.nist.gov/publications/nistpubs/800-57/sp800-57-part1-revised2 Mar08-2007.pdf> (hereinbelow, referred to as "Recommendation for Key Management: Part 1: General") are known.

Particularly, Japanese Patent Application Laid-Open No. 2009-094676 discloses such a technique that an administrator decides an algorithm, as a policy, which is used tor encryption of communication, thereby disabling an algorithm which does not conform with the policy to be selected as an algorithm to be used for encryption.

However, according to the technique disclosed in Japanese Patent Application Laid-Open No. 2009-094676, a target of restriction by the policy is only the algorithm to be used for encryption. Therefore, such a policy does not exert an influence on a preparation phase to perform the encryption communication. Thus, at the time of handshake which is performed prior to the encryption communication, a hash algorithm which satisfies predetermined safety cannot be controlled.

SUMMARY OF THE INVENTION

It is, therefore, an aspect of the invention to suppress that a hash algorithm which is not safe is used at the time of handshake which is performed prior to encryption communication.

According to an aspect of the invention, there is provided an information processing apparatus for performing encryption communication with an external apparatus in accordance with an encryption communication protocol, comprising an inhibition unit configured to inhibit use of a set of algorithms which do not satisfy a predetermined condition among a plurality of sets of algorithms which are used in the encryption communication protocol, wherein the set of algorithms whose use is inhibited by the inhibition unit is a set of algorithms which need to transmit a message with a signature of the information processing apparatus to the external apparatus at the time of handshake which is performed between the information processing apparatus and the external apparatus prior to the encryption communication.

According to the invention, such a situation that a hash algorithm which is not safe is used at the time of the handshake which is performed prior to the encryption communication can be suppressed.

Further features of the present invention will become apparent from the following description of exemplary embodiments with reference to the attached drawings.

BRIEF DESCRIPTION OF THE DRAWINGS

FIG. 3 is a diagram illustrating information included in a server certification.

FIGS. 12A and 12B are diagrams illustrating Cipher Suite whose use is inhibited.

FIG. 13 is a flowchart for describing a second example of the process of the multifunction machine.

DESCRIPTION OF THE EMBODIMENTS

Figure 1:
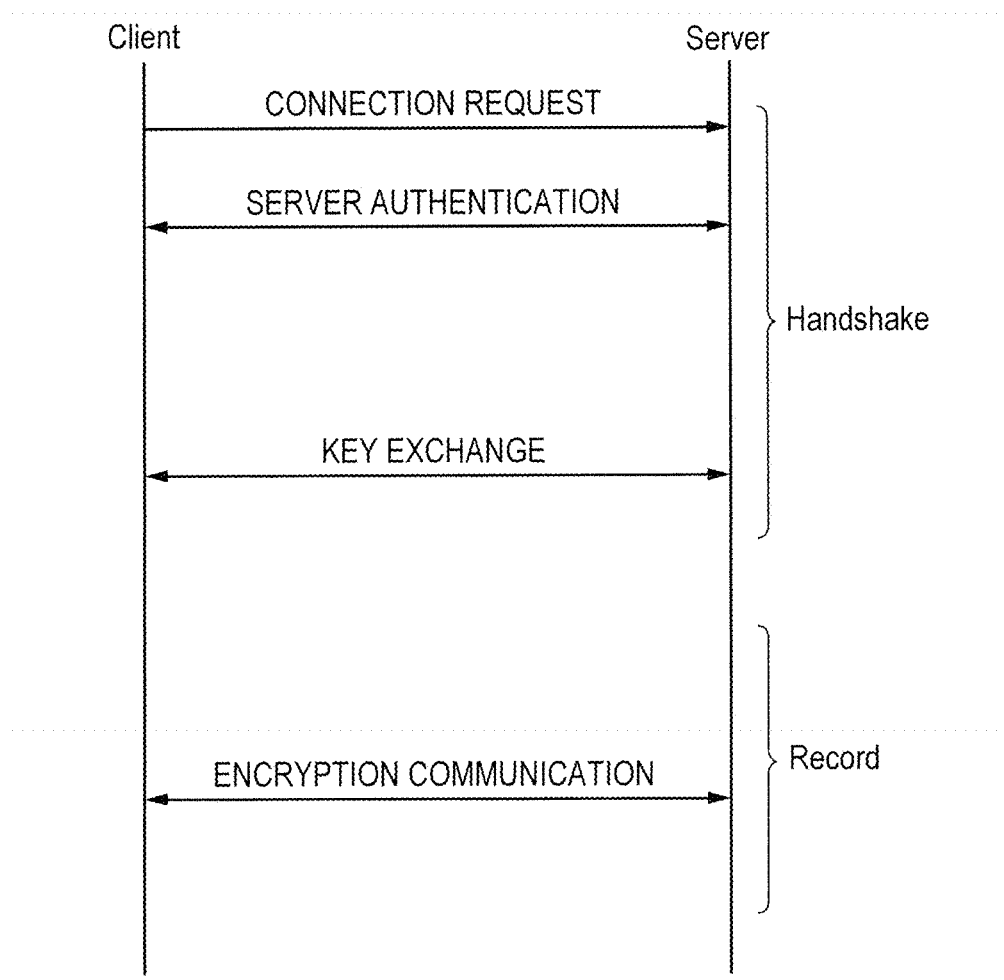
FIG. 1 is a diagram for describing an outline of communication by SSL/TLS.

Preferred embodiments of the present invention will now be described in detail in accordance with the accompanying drawings.

In the following embodiments, a case of using SSL (Secure Socket Layer) or TLS (Transport Layer Security) as an encryption communication protocol, will be described as an example. First, an example of an outline of encryption communication based on those encryption communication protocols will be described. In the following description, SSL or TLS is referred to as SSL/TLS in accordance with necessity.

In the case of performing encryption communication by SSL/TLS, first, a ClientHello message and a ServerHello message are exchanged between a client and a server. Thus, a handling rule of the communication protocol and Cipher Suite to be used for the encryption communication is decided between the client and the server.

Cipher Suite is a set of various kinds of algorithms. The following information is included in the set of algorithms. That is, "encryption communication protocol name", "key exchange algorithm", "server authentication algorithm", "encryption algorithm", and "hash algorithm used for calculation of MAC (Message Authentication Code)" are included.

That is, Cipher Suite has a construction such as "encryption communication protocol name_key exchange algorithm_server authentication algorithm_encryption algorithm_hash algorithm used for calculation of MAC".

For example, TLS_DHE_RSA_WITH_AES_256_CBC_SHA (Cipher

Suite) shows the following meaning. First, TLS is used for the encryption communication protocol. DHE (Diffie Hellman Ephemeral) is used for the key exchange algorithm. RSA is used for the server authentication algorithm. AES (256 bits, CBC mode) is used for the encryption algorithm. SHA1 is used for the hash algorithm used for calculation of MAC.

In order to perform the encryption communication by SSL/TLS with the information processing apparatus, it is necessary that both of the client and the server support same Cipher Suite. For this purpose, many information apparatuses for performing the encryption communication assure connection performance by supporting a plurality of Cipher Suites.

On the other hand, due to reasons such as improvement of performance of computers, discovery of a weak point of the algorithm, mathematical advancement, and the like, there is a risk that a safety of those various kinds of algorithms deteriorates with the elapse of time and a necessary safety will not be able to be assured sometime soon (risk of jeopardization).

As for the safety of algorithms, for example, in "Recommendation for Key Management: Part 1: General", NIST (National Institute of Standards and Technology) decides guidelines of a cipher algorithm to be used by the U.S. Federal Government. The settling of NIST has a large influence, Therefore, the guidelines decided by NIST are actually guidelines which are referred to not only by the U.S. Federal Government but also by many vendors and users.

As disclosed in "Recommendation for Key Management: Part 1: General", a period of time during which the safety can be assured exists every various kinds of algorithms or every key length (size). If the relevant algorithm and a key of such a key length (size) are continuously used over such a period of time, it results in a risk on security such as a leakage of information or the like. Therefore, in an environment in which, particularly, information of a high secrecy such as organization of government or the like, importance is attached to the safety rather than the continuity. Thus, in the encryption communication by SSL/TLS, there is a case of demanding use of only the algorithms which are considered to be safe in "Recommendation for Key Management: Part 1: General".

As illustrated in FIG. 1, SSL/TLS has a Handshake protocol and a Record protocol. In the following description, the Handshake protocol is abbreviated to "Handshake" in accordance with necessity. Similarly, the Record protocol is abbreviated to "Record" in accordance with necessity.

In Handshake, each of a Server and a Client authenticates a communication partner and shares a common key by a key exchange. In Record, the encryption communication using the common key shared by the Server and the Client by Handshake is performed.

Figure 2:
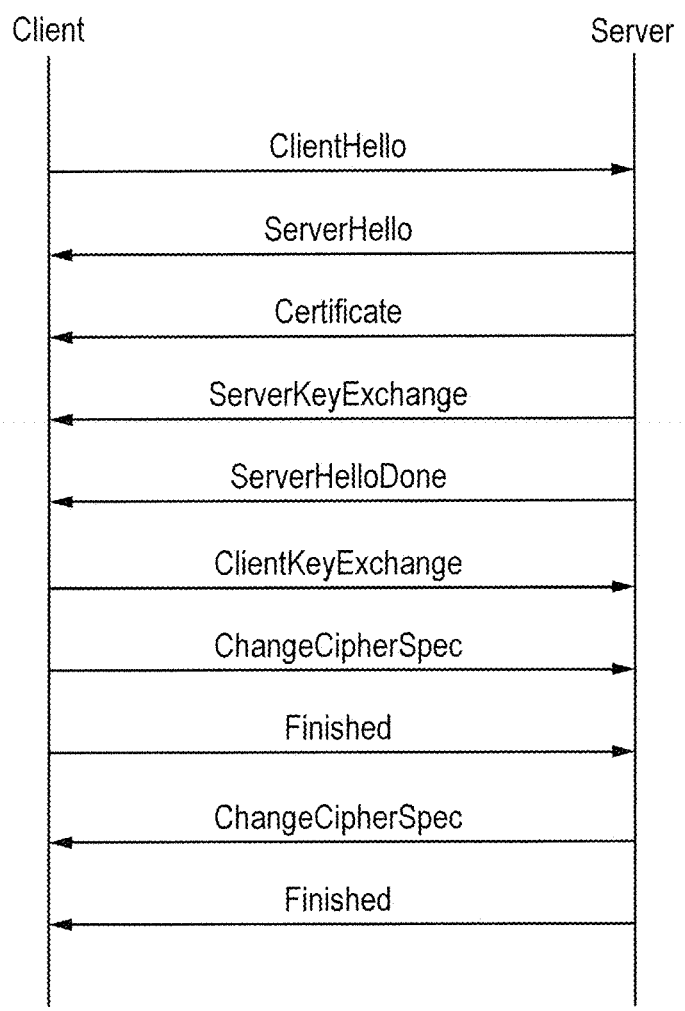
FIG. 2 is a diagram for describing communication by Handshake.

Handshake will now be described in detail with reference to FIG. 2.

In Handshake, first, the Client transmits a ClientHello message as a connection request to the Server. Information of a list of protocol versions to which the Client corresponds and Cipher Suites and the like are included in the ClientHello message. By allowing option information of Signature Algorithms extension to be included in the ClientHello message, a list of Plash algorithms which can be used by the Client can be also notified to the Server.

The Server determines the protocol version and Cipher Suite to be used from the information of the ClientHello message on the basis of, for example, a priority of Cipher Suite of the Server. The Server transmits a ServerHello message to the Client. The information of the protocol version and Cipher Suite determined by the Server and the like are included in the ServerHello message.

Subsequently, the Server transmits a Certificate message to the Client. A server certification of an X.509 format is included in the Certificate message, for example, information illustrated in FIG. 3 is included in the server certification of the X.509 format. After that, in dependence on a method of the key exchange by Cipher Suite determined as mentioned above, there is a case where the Server transmits a ServerKeyExchange message (message with a signature of the Server at the time of Handshake) to the Client. In such Cipher Suite, a cipher key is formed from parameters generated by both of the Server and the Client.

Specifically speaking, a case where DHE (Diffie Hellman Ephemeral), ECDHE (Elliptic Curve Diffie Hellman Ephemeral), or the like is used as a key exchange algorithm corresponds to such a case. When, for example, RSA is used as a key exchange algorithm, the ServerKeyExchange message is not transmitted.

Parameters for the key exchange and information such as signatures to such parameters and the like are included in the ServerKeyExchange message. As mentioned above, the ServerKeyExchange message is a message with the signature of the Server.

Subsequently, the Server transmits ServerHelloDone to the Client, thereby notifying the Client of the end of a series of processes of the Server.

Subsequently, the Client transmits a ClientKeyExchange message to the Server. Information serving as a base of the cipher key which is shared by the Client and the Server is included in the ClientKeyExchange message.

Subsequently, the Client transmits a ChangeCipherSpec message to the Server. Thus, the Client notifies the Server that the data to be used for the subsequent communication is encrypted by decided Cipher Suite. After that, the Client transmits a Finished message to the Server. A MAC value to confirm that all of the messages so far are not altered is included in the Finished message.

After that, the Server transmits the ChangeCipherSpec message and the Finished message to the Client in this order.

In this manner, Handshake is completed.

Like a technique disclosed in the Official Gazette of Japanese Patent Application Laid-Open No. 2009-094676, if a target of the restriction by the policy is set only to the algorithm to be used for the encryption, the policy exerts an influence only on an intensity regarding the safety of the encryption in the Record and does not influence on Handshake. In other words, among the foregoing four algorithms constructing Cipher Suite, the algorithm serving as a target of the restriction is only the encryption algorithm. The foregoing four algorithms are "server authentication algorithm", "key exchange algorithm", "encryption algorithm", and "hash algorithm used for calculation of MAC".

Further, even if the algorithms constructing Cipher Suite are restricted to the algorithms which satisfy a predetermined safety, there are the following problems. That is, the hash algorithm to be used for a signature in the ServerKeyExchange message in Handshake cannot be controlled. Thus, there is such a problem that the weak hash algorithm (for example, SHA1 or MD5) is used. In the present Description, the algorithm which is not safe in "Recommendation for Key Management: Part 1: General" or the algorithm which is not disclosed in "Recommendation for Key Management: Part 1: General" is assumed to be a weak cipher (algorithm). In "Recommendation for Key Management: Part 1: General", in and after 2010, it is specified that if SHA1 is used for a signature, it is not safe. With respect to MD5, nothing is disclosed in "Recommendation for Key Management: Part 1: General".

An embodiment for preventing the weak hash algorithm from being used at the time of Handshake will be described hereinbelow with reference to the drawings by mentioning a case, as an example, where the encryption communication by SSL/TLS is performed.

First Embodiment

First, the first embodiment will be described. In the embodiment, the Server which performs the encryption communication by SSL/TLS controls the method of the key exchange to be used in Cipher Suite by the information of the received. ClientHello message. Thus, use of the weak hash algorithm can be prevented in the encryption communication by SSL/TLS. The information processing apparatus serving as a Server which performs the encryption communication is, for example, an image processing apparatus such as a multifunction machine or the like.

Figure 4:
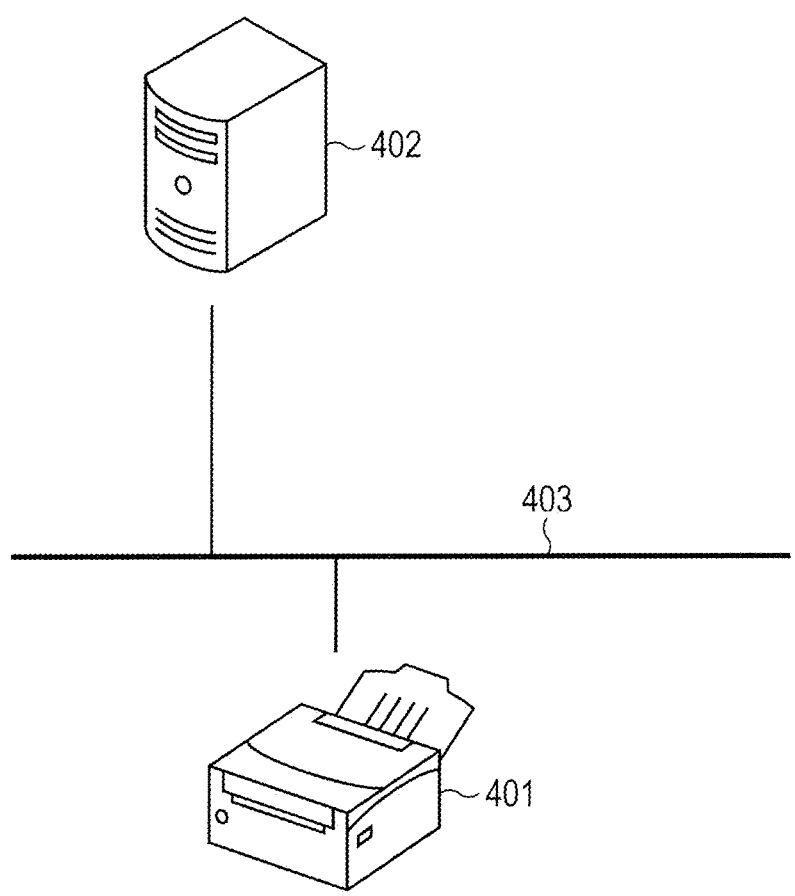
FIG. 4 is a diagram illustrating a network construction.

FIG. 4 is a diagram illustrating an example of a network construction for performing the encryption communication.

A multifunction machine 401 and a PC (Personal Computer) 402 are connected through a network 403 so that they can communicate with each other. As a Server, the multifunction machine 401 receives an access request from the PC 402. For example, the access request is an access request to a Remote UI screen. When there is the access request from the PC 402, information (for example, authentication information such as a password or the like for log-in) flowing on a communication path is encrypted by SSL/TLS.

In the embodiment, an example in the case where the number of PCs 402 connected to the multifunction machine 401 through the network 403 so that they can communicate with each other is equal to 1 is shown. However, the number of multifunction machines 401 and the number of PCs 402 are not limited to 1.

Figure 5:
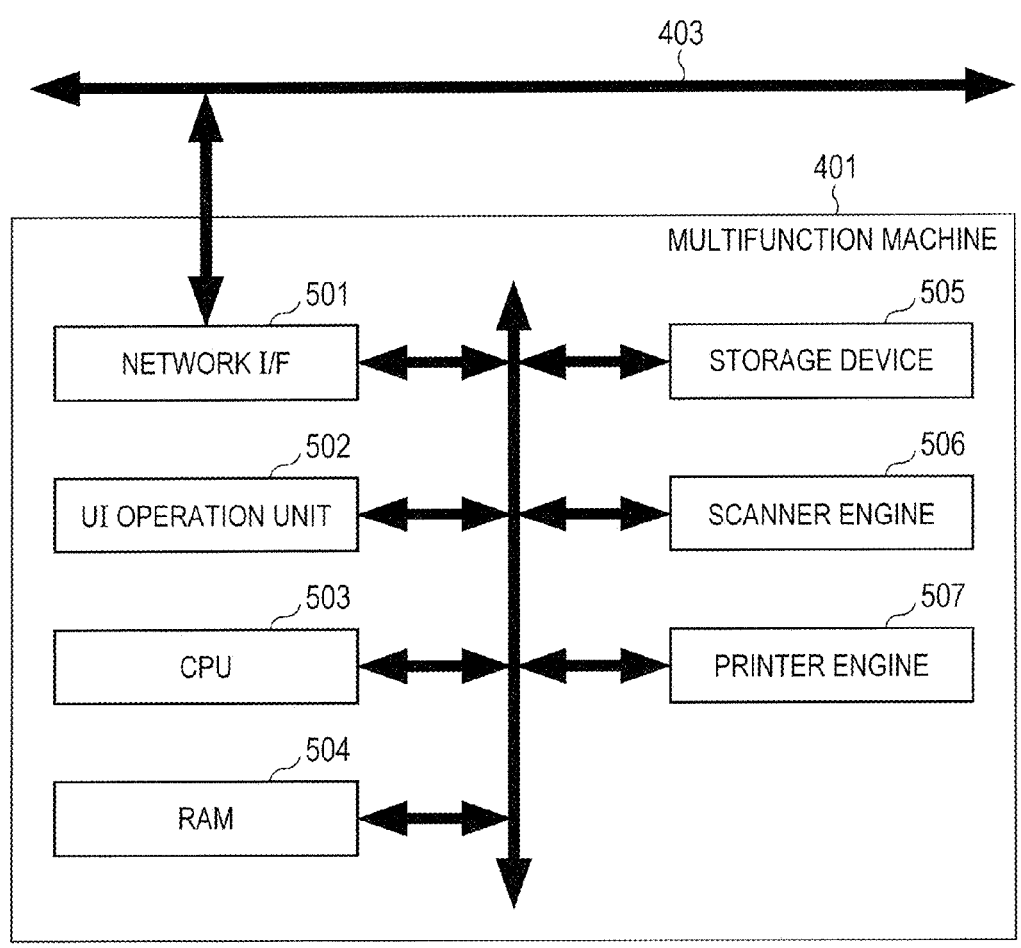
FIG. 5 is a diagram illustrating a construction of hardware of a multifunction machine.

FIG. 5 is a diagram illustrating an example of a construction of hardware of the multifunction machine 401.

A network I/F (interface) 501 is provided to communicate with an external apparatus such as a PC 402 or the like through the network 403.

A UI (user interface) operation unit 502 receives the operation by the user to the multifunction machine 401 and displays various kinds of information. For example, an administrator and other general users are included in the users.

A CPU (central processing unit) 503 executes program codes and controls the whole multifunction machine 401.

A RAM (random, access memory) 504 temporarily stores data in order to allow the CPU 503 to process the various kinds of information. The program codes which are executed by the CPU 503, image data, and the like are stored in the RAM 504.

A storage device 505 stores various kinds of information such as program codes, image data, setting values, encryption key, and the like.

A scanner engine 506 optically reads an image printed on a sheet medium.

A printer engine 507 prints the image data onto the sheet medium by using a well-known technique such as electrophotographic technique, ink jet technique, or the like.

Figure 6:
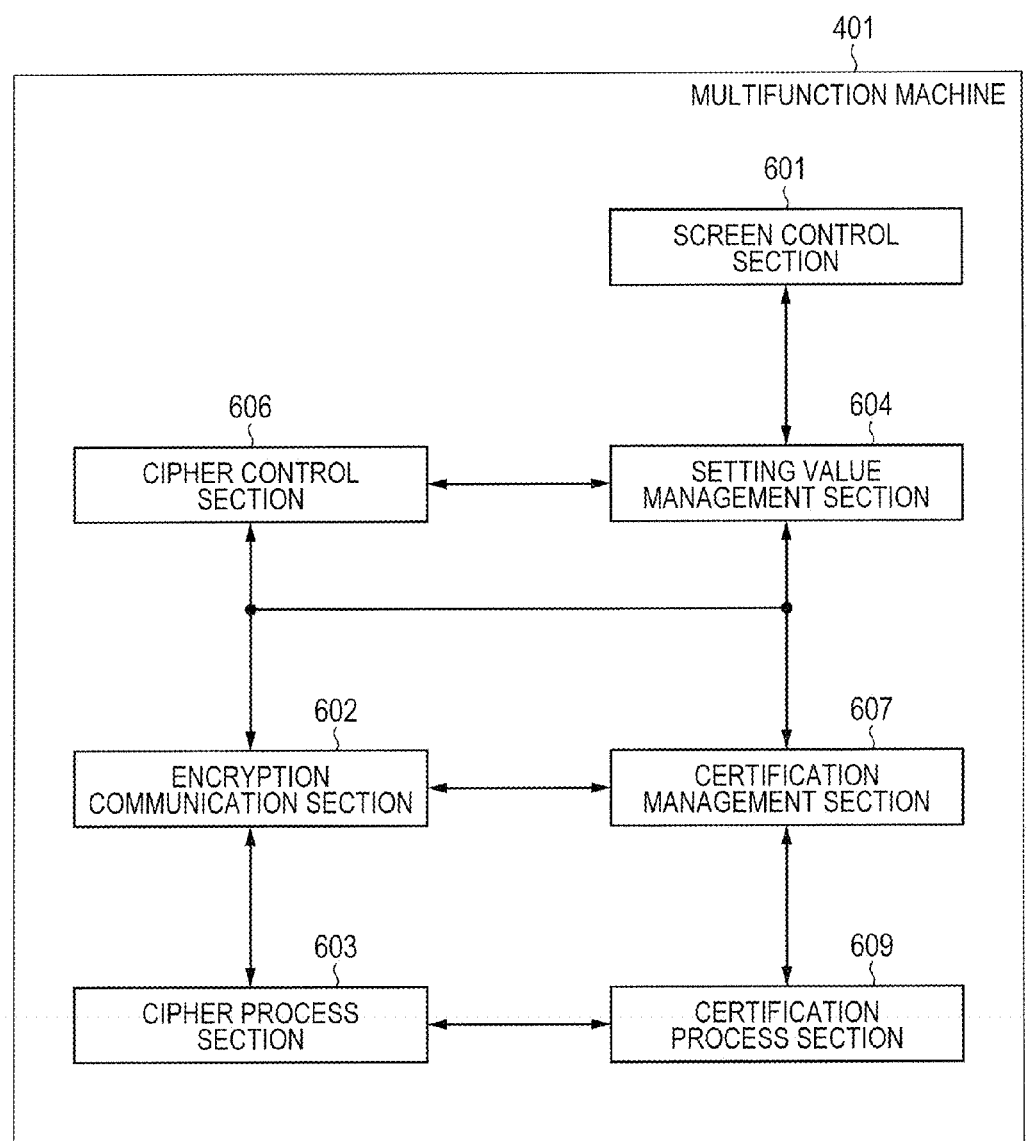
FIG. 6 is a diagram illustrating a construction of software of the multifunction machine.

FIG. 6 is a diagram, illustrating an example of a construction of software of the multifunction machine 401. Each processing section illustrated in FIG. 6 is a control program stored in the storage device 505 unless otherwise specified. Those control programs are executed by the CPU 503.

A screen control section 601 controls the UI operation unit 502. Specifically speaking, the screen control section 601 performs a display of the various kinds of information to the UI operation unit 502, a reception of an operation, request from the user to the UI operation unit 502, and the like.

An encryption communication section 602 performs encryption communication with an external apparatus through the network I/F 501.

A cipher process section 603 executes various kinds of cipher related processes. An encryption/decoding of data, a generation of a hash value, a generation of MAC, a signature, a verification, and the like are included in the cipher related processes.

Figure 7:
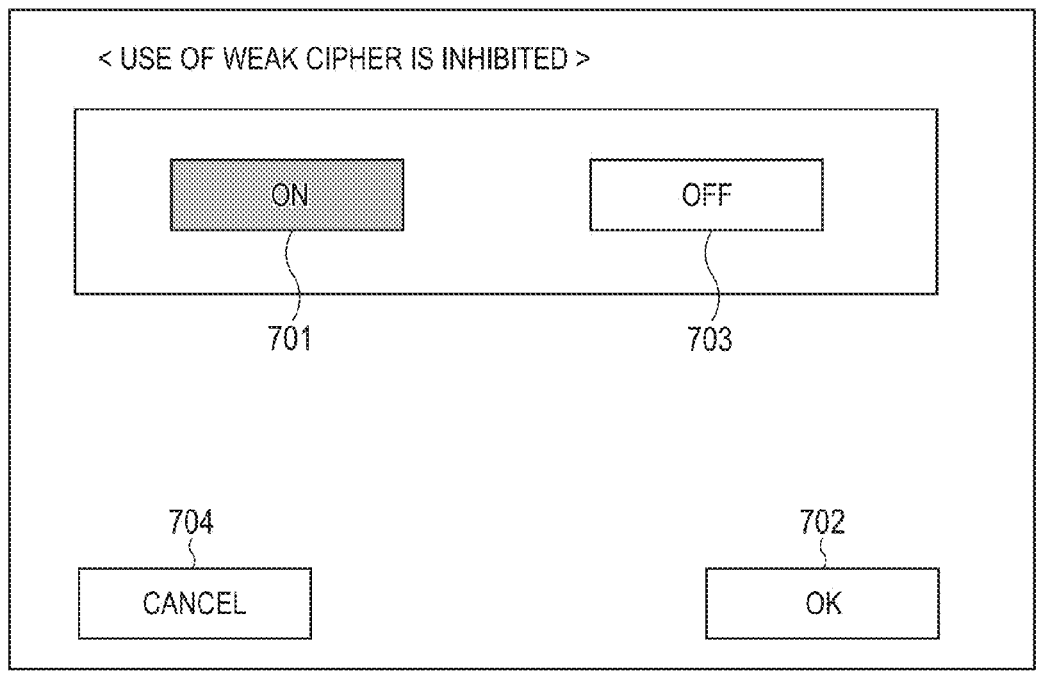
FIG. 7 is a diagram illustrating a setting screen.

A setting value management section 604 changes the setting values stored in the storage device 505. The change of the setting values is executed when the setting about whether or not use of the weak cipher (weak algorithm) is inhibited has been changed by the administrator through the screen control section 601 by using a setting display screen. FIG. 7 is a diagram illustrating an example of a setting screen 700. When the administrator executes a predetermined operation to the UI operation unit 502, the screen control section 601 displays the setting screen 700.

The setting screen 700 is a GUI (graphic user-interface) for inhibiting the encryption communication of a predetermined cipher intensity. After the administrator depressed an ON button 701, when he depresses an OK button 702, the setting value management section 604 sets the setting values to values showing that the setting to inhibit use of the weak cipher (weak algorithm) is validated. After the administrator depressed an OFF button 703, when he depresses the OK button 702, the setting value management section 604 sets the setting values to values showing that the setting to inhibit use of the weak cipher is invalidated. When the OK button 702 is depressed, the screen control section 601 turns off the display of the setting screen 700. Even when the administrator depresses a CANCEL button 704, the screen control section 601 turns off the display of the setting screen 700. In this case, the setting value management section 604 does not change the setting values irrespective of the contents of the operation to the setting screen 700.

When the encryption communication section 602 performs the encryption, communication, a cipher control section 606 confirms the setting values which are managed by the setting value management section 604. Thus, when the setting to inhibit use of the weak cipher is valid, the cipher control section 606 controls Cipher Suite (set of algorithms which satisfy a predetermined condition) which may be used by the encryption communication section 602.

A certification management section 607 stores a server certification (public key certification) of an X.509 format which is used for the server authentication by the encryption communication section 602, a pair of secret keys, a CA certification which has previously been installed, and the like into the storage device 505 and manages them. In the following description, the server certification (public key certification) is abbreviated to "certification" in accordance with necessity.

A certification process section 609 executes a certification related process. An analysis and a generation of a certification, an extraction of necessary information, a verification about validity, and the like are included in the certification related process.

Figure 8:
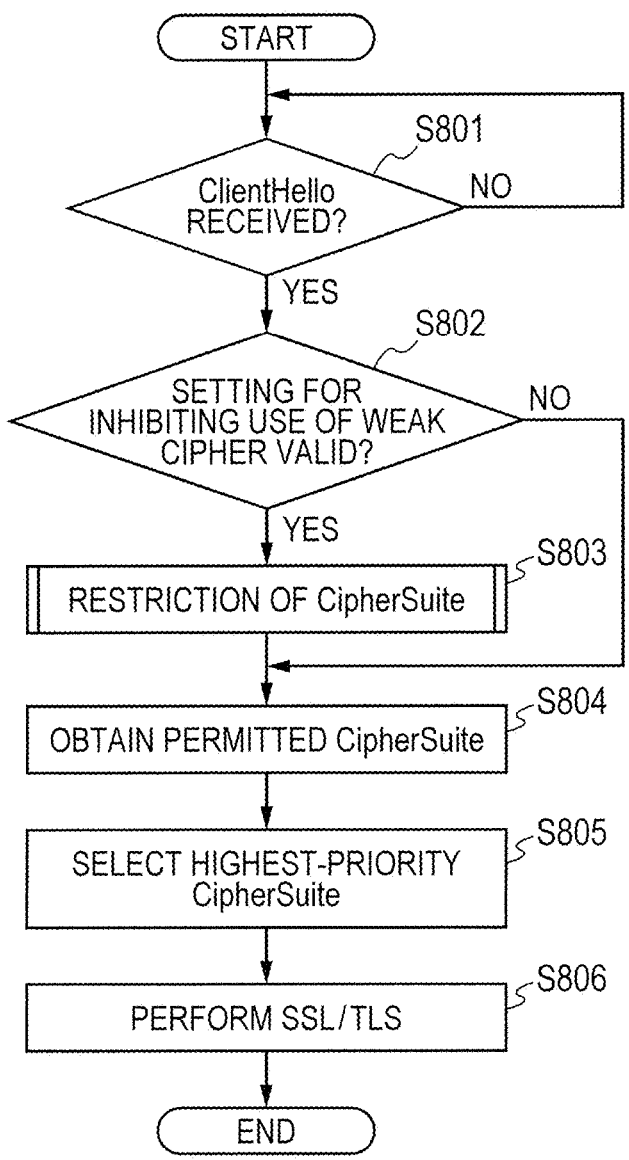
FIG. 8 is a flowchart for describing a first example of a process of the multifunction machine.

An example of processes of the multifunction machine 401 will be described hereinbeiow with reference to a flowchart of FIG. 8. A case where when the policy to inhibit use of the weak cipher has been, applied to the multifunction machine 401, the next control is performed will now be described. That is, control for restricting Cipher Suite which is used for the encryption communication by SSL/TLS and inhibiting that the weak hash is used in ServerKeyExchange will be described. The flowchart shown in FIG. 6 is realized by, for example, a method whereby the CPU 503 executes the control program stored in the storage device 505.

First, in step S801, the encryption communication section 602 waits until the ClientHello message is received through the network I/F 501. In the following description, the ClientHello message is abbreviated to "ClientHello" in accordance with necessity. When ClientHello is received, the encryption communication section 602 inquires of the cipher control section 606 about Cipher Suite which may be used in the encryption communication.

Subsequently, in step S802, by referring to the setting values managed by the setting value management section 604, the cipher control section 606 decides whether or not the setting to inhibit, use of the weak cipher is valid.

As a result of the decision, if the setting to inhibit use of the weak cipher is not valid, step S803 is omitted and the processing routine advances to step S804, which will be described hereinafter. In this case, the cipher control section 606 does not restrict Cipher Suite.

If the setting to inhibit use of the weak cipher is valid, step S803 follows. In step S803, the cipher control section 606 executes an inhibiting process, in the embodiment, the cipher control section 606 executes a process for restricting Cipher Suite which can be used for the encryption communication by SSL/TLS. Step S804 follows.

In step S804, the cipher control section 606 obtains Cipher Suite whose use is permitted.

Subsequently, in step S805, the cipher control section 606 selects Cipher Suite of the highest priority in the priority order of Cipher Suites set in the multifunction machine 401.

Subsequently, in step S806, the encryption communication section 602 executes the encryption communication by SSL/TLS by using Cipher Suite selected in step S805.

Subsequently, an example of the process (process to inhibit Cipher Suite) of step S803 in FIG. 8 will be described with reference to flowcharts of FIGS. 9 to 11.

Figure 9:
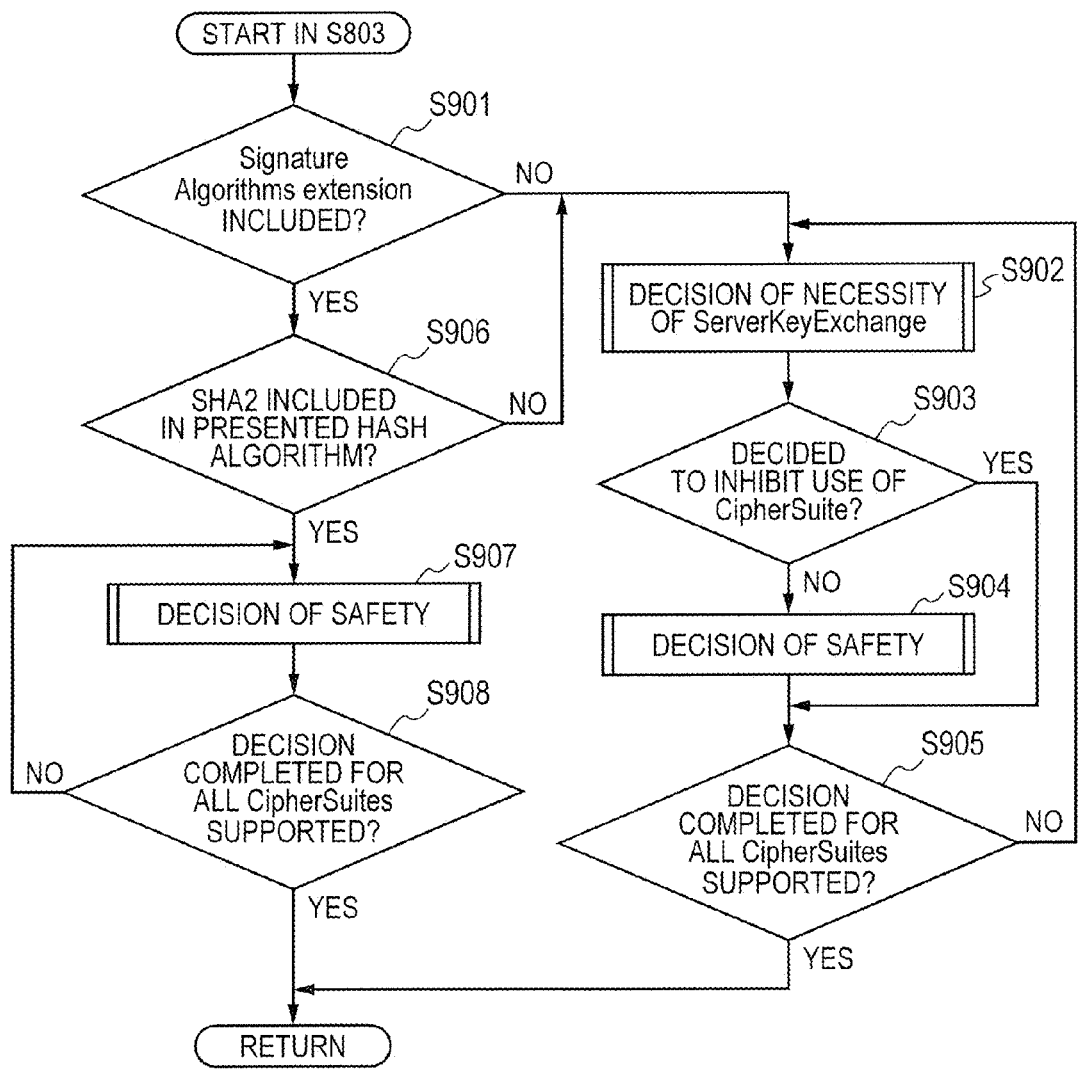
FIG. 9 is a flowchart for describing details of step S803 in FIG. 8.
Figure 10:
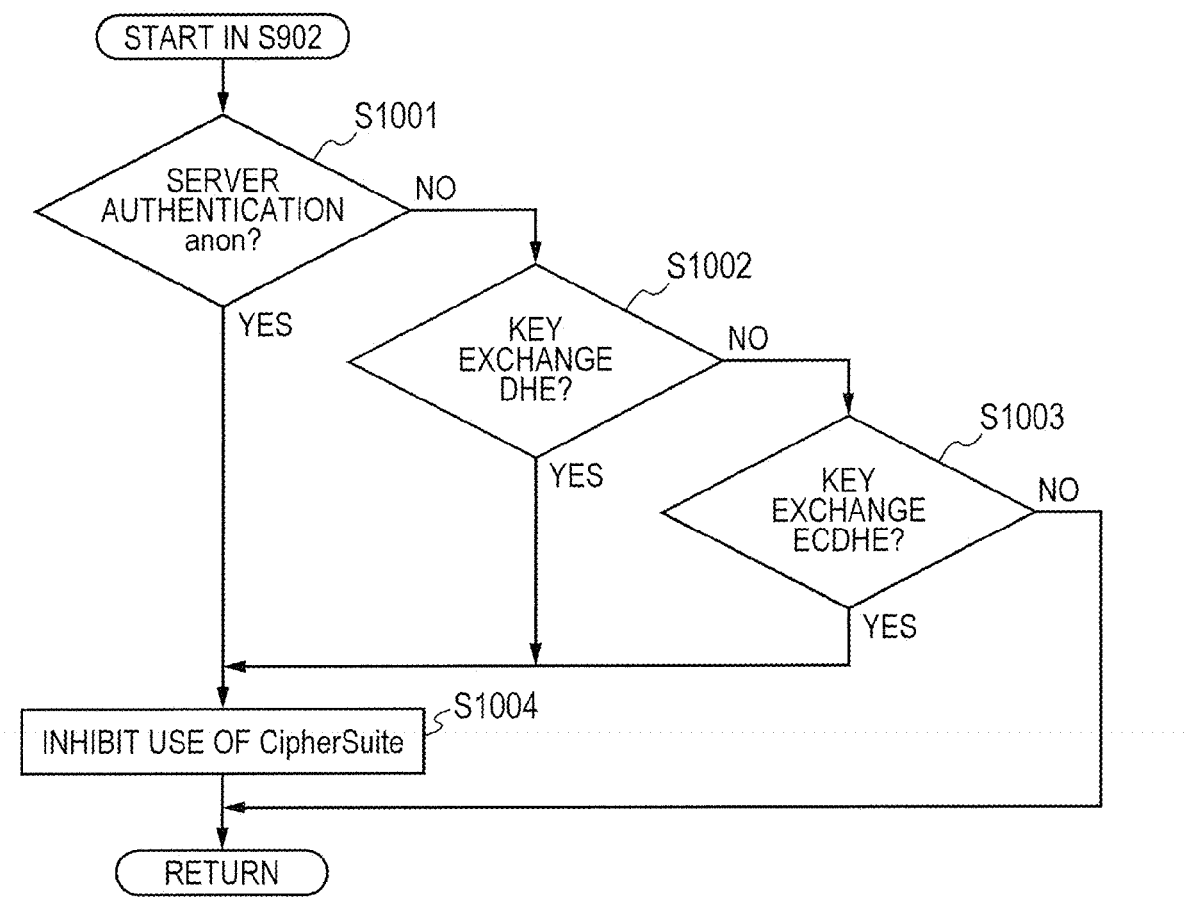
FIG. 10 is a flowchart for describing details of step S902 in FIG. 9.

In step S901 in FIG. 9, the cipher control section 606 decides whether or not Signature Algorithms extension is included in ClientHello received in step S801. As a result of the decision, if Signature Algorithms extension is not included, step S902 follows. In this case, the hash algorithm which can be used for a signature to the certification of the PC 402 is not presented.

In step S902, the cipher control section 606 executes a deciding process. In the embodiment, the cipher control section 606 decides whether or not individual Cipher Suite supported, by the encryption communication section 602 is Cipher Suite in which the ServerKeyExchange message is necessary. In the following description, the ServerKeyExchange message is abbreviated to "ServerKeyExchange" in accordance with necessity.

The necessity of ServerKeyExchange is decided by, for example, discriminating names of a server authentication algorithm and a key exchange algorithm included in Cipher Suite. A specific example of the process of step S902 will be described with reference to FIG. 10.

In step S1001, the cipher control section 606 decides whether or not the server authentication algorithm included in Cipher Suite as a check target is anon (anonymous). As a result of the decision, if the server authentication algorithm is anon, Cipher Suite as a check target is Cipher Suite in which ServerKeyExchange is necessary. Therefore, step S1004 follows and the cipher control section 606 inhibits use of Cipher Suite as a check target. The processing routine advances to step S902 in FIG. 9.

If the server authentication algorithm is not anon, step S1002 follows. In step S1002, the cipher control section 606 decides whether or not the key exchange algorithm included in Cipher Suite as a check target is DHE (Diffie Hellman Ephemeral). As a result of the decision, if the key exchange algorithm is DHE, Cipher Suite as a check target is Cipher Suite in which ServerKeyExchange is necessary. Therefore, step S1004 follows and the cipher control section 606 inhibits use of Cipher Suite as a check target. The processing routine advances to step S902 in FIG. 9.

If the key exchange algorithm, is not DHE, step S1003 follows. In step S1003, the cipher control section 606 decides whether or not the key exchange algorithm included in Cipher Suite as a check target is ECDHE (Elliptic Curve Diffie Hellman Ephemeral). As a result of the decision, if the key exchange algorithm is ECDHE, Cipher Suite as a check target is Cipher Suite in which ServerKeyExchange is necessary. Therefore, step S1004 follows and the cipher control section 606 inhibits use of Cipher Suite as a check target. The processing routine advances to step S902 in FIG. 9.

In step S1003, if it is decided that the key exchange algorithm is not ECDHE, the processing routine advances to step S902 in FIG. 9. In this case, since the key exchange algorithm and the server authentication algorithm are equal (for example, RSA), ServerKeyExchange is unnecessary.

Returning to the description of FIG. 9, if whether or not Cipher Suite as a check target is Cipher Suite in which ServerKeyExchange is necessary is decided in step S902 as mentioned above, step S903 follows.

In step S903, the cipher control section 606 decides whether or not it is decided in S902 that use of Cipher Suite as a check target is inhibited. As a result of the decision, if it is decided that use of Cipher Suite as a check target is inhibited, step S904 is omitted and the processing routine advances to step S905, which will be described hereinafter.

If it is not decided that use of Cipher Suite as a check target is inhibited, step S904 follows. That is, if Cipher Suite as a check target is Cipher Suite in which the ServerKeyExchange message is unnecessary, step S904 follows. In step S904, the cipher control section 606 executes the deciding process. In the embodiment, the cipher control section 606 further decides the safety of Cipher Suite as a check target.

The decision about the safety in step S904 is made by confirming whether or not individual algorithm constructing Cipher Suite which is supported by the encryption communication section 602 is a weak algorithm. A specific example of the process of step S904 will be described with reference to FIG. 11.

In step S1101, the cipher control section 606 decides whether or not the hash algorithm which is used for the signature of the server certification is SHA2 (Secure Hash Algorithm 2).

As a result of the decision, if the hash algorithm is not SHA2, step S1112 follows. In step S1112, the cipher control section 606 inhibits use of Cipher Suite as a check target. The processing routine advances to step S905 in FIG. 9.

If a result of the check indicates SHA2, step S1102 follows. In step S1102, the cipher control section 606 decides whether or not the public key algorithm, of the server certification is ECDSA (Elliptic Curve Digital Signature Algorithm).

As a result of the decision, if the public key algorithm, of the server certification is ECDSA, step S1103 follows. In step S1103, the cipher control section 606 decides whether or not a key length (size) of the public key in the server certification is equal to or larger than 224 bits. As a result of the decision, if the key length (size) of the public key is smaller than 224 bits, step S1112 follows. In step S1112, the cipher control section 606 inhibits use of Cipher Suite as a check target. The processing routine advances to step S905 in FIG. 9.

If the key length (size) of the public key is equal to or larger than 224 bits, the processing routine advances to step S1105, which will be described hereinafter.

In step S1102, if it is decided that the public key algorithm of the server certification is not ECDSA (that is, it is DSA (Digital Signature Algorithm) or RSA), step S1104 follows. In step S1104, the cipher control section 606 decides whether or not the key length (size) of the public key in the server certification is equal to or larger than 2048 bits. As a result of the decision, if the key length (size) of the public key in the server certification is smaller than 2048 bits, step S1112 follows. In step S1112, the cipher control section 606 inhibits use of Cipher Suite as a check target. The processing routine advances to step S905 in FIG. 9.

If the key length (size) of the public key in the server certification is equal to or larger than 2048 bits, step S1105 follows.

The decision in steps S1101 to S1104 is made based on, for example, a result of confirmation made by the certification process section 609 by checking a SignatureAlgorithm field of the server certification of Cipher Suite as a check target.

In step S1105, the cipher control section 606 decides whether or not the key exchange algorithm included in Cipher Suite as a check target is ECDH (Elliptic Curve Diffie Hellman).

As a result of the decision, if the key exchange algorithm is ECDH, S1106 follows. In step S1106, the cipher control section 606 decides whether or not a key length (size) of the public key which is used in the key exchange algorithm is equal to or larger than 224 bits. As a result of the decision, if the key length (size) of the public key which is used in the key exchange algorithm is smaller than 224 bits, step S1112 follows. In step S1112, the cipher control section 606 inhibits use of Cipher Suite as a check target. The processing routine advances to step S905 in FIG. 9.

If the key length (size) of the public key which is used in the key exchange algorithm is equal to or larger than 224 bits, the processing routine advances to step S1108, which will be described hereinafter.

In step S1105, if it is decided that the key exchange algorithm is not ECDH (that is, it is DH), step S1107 follows. In step S1107, the cipher control section 606 decides whether or not the key length (size) of the public key which is used in the key exchange algorithm is equal to or larger than 2048 bits. As a result of the decision, if the key length (size) of the public key which is used in the key exchange algorithm is smaller than 2048 bits, step S1112 follows. In step S1112, the cipher control section 606 inhibits use of Cipher Suite as a check target. The processing routine advances to step S905 in FIG. 9.

If the key length (size) of the public key which is used in the key exchange algorithm is equal to or larger than 2048 bits, the processing routine advances to step S1108.

In step S1108, the cipher control section 606 decides whether or not the encryption algorithm included in Cipher Suite as a check target is AES (Advanced Encryption Standard). As a result of the decision, if the encryption algorithm is AES, the processing routine advances to step S1110, which will be described hereinafter.

If the encryption algorithm is not AES, step S1109 follows. In step S1109, the cipher control section 606 decides whether or not the encryption algorithm, included in Cipher Suite as a check target is 3TDES (3 key Triple Data Encryption Standard). As a result of the decision, if the encryption algorithm is not 3TDES, step S1112 follows. In step S1112, the cipher control section 606 inhibits use of Cipher Suite as a check target. The processing routine advances to step S905 in FIG. 9.

If the encryption algorithm is 3TDES, step S1110 follows. In step S1110, the cipher control section 606 decides whether or not the hash algorithm which is used for calculation of MAC included in Cipher Suite as a check target is SHA1. As a result of the decision, if the hash algorithm used for calculation of MAC is SHA1, the processing routine advances to step S905 in FIG. 9.

If the hash algorithm used for calculation of MAC is not SHA1, step S1111 follows. In step S1111, the cipher control section 606 decides whether or not the hash algorithm used for calculation of MAC included in Cipher Suite as a check target is SHA2. As a result of the decision, if the hash algorithm used for calculation of MAC is SRA2, the processing routine advances to step S905 in FIG. 9.

If the hash algorithm used for calculation of MAC is not SHA2, step S1112 follows. In step S1112, the cipher control section 606 inhibits use of Cipher Suite as a check target. The processing routine advances to step S905 in FIG. 9.

FIG. 12A illustrates the first example of Cipher Suite whose use is inhibited. In FIG. 12A, "o" indicates Cipher Suite which can be used and "x" indicates Cipher Suite whose use is inhibited.

When the decision in step S902 or both steps S902 and S904 with respect to Cipher Suite as a check target is finished as mentioned above, S905 follows. In step S905, the cipher control section 606 decides whether or not the decision in step S901 or both steps S901 and S903 has been completed to all of Cipher Suites which are supported by the encryption communication section 602.

As a result of the decision, if the decision to all of Cipher Suites is not completed yet, the foregoing processes of steps S902 to S904 are executed to all of Cipher Suites supported by the encryption communication section 602. As order of Cipher Suites to which the processes of steps S901 to S903 are executed, for example, the priority order of Cipher Suites set in the multifunction machine 401 can be mentioned. However, such order is not limited to it. The processing routine advances to step S804 in FIG. 8.

In step S901 in FIG. 9 mentioned above, if Signature Algorithms extension is included in ClientHello received in step S801, step S906 follows. In this case, the hash algorithm which can be used for signature to the certification of the PC 402 has been presented. In step S906, the cipher control section 606 decides whether or not SHA2 is included in Signature Algorithms extension.

As a result of the decision, if SHA2 is not included, the processing routine advances to step S902 in a manner similar to the case where it is decided in step S901 that Signature Algorithms extension is not included.

If SHA2 is included, step S907 follows and the cipher control, section 606 executes the deciding process. Since the process of step S907 is substantially the same as that of step S904, its detailed description is omitted. The processing routine advances to step S908.

FIG. 12E illustrates the second example of Cipher Suite whose use is inhibited. In FIG. 12B, "o" indicates Cipher Suite which can be used and "x" indicates Cipher Suite whose use is inhibited.

In step S908, the cipher control section 606 decides whether or not the decision in step S907 has been completed to all of Cipher Suites supported by the encryption communication section 602.

As a result of the decision, if the decision to all of Cipher Suites is not completed yet, the process of step S907 is executed to all of Cipher Suites supported by the encryption communication section 602. As order of Cipher Suites to which the process of step S907 is executed, for example, the priority order of Cipher Suites set in the multifunction machine 401 can be mentioned. However, such order is not limited to it.

As illustrated in FIGS. 10 to 12B, in the embodiment, use of Cipher Suites in which the encryption key is exchanged by using the public key of the Server (in the embodiment, multifunction machine 401) is permitted.

As mentioned above, in the embodiment, in the case where the setting to inhibit use of the weak cipher has been applied to the multifunction machine 401, the key exchanging method which is used in Cipher Suite is controlled by information of received ClientHello. More specifically speaking, when Signature Algorithms extension including SHA2 exists in ClientHello, the key exchange which needs ServerKeyExchange is permitted. On the other hand, if Signature Algorithms extension including SHA2 does not exist in ClientHello, the key exchange which needs ServerKeyExchange is not used.

Thus, even in ServerKeyExchange by SSL/TLS, use of the weak hash algorithm such as MD5, SHA1, or the like can be controlled.

Also with respect to individual algorithm constructing Cipher Suite, whether or not a reference regarding the safety based on the cipher intensity is satisfied is individually decided every algorithm. Therefore, at the time of the hand shake which is performed prior to the encryption communication, such a situation that the hash algorithm, which is not safe is used can be suppressed. Therefore, the encryption communication protocol can be limited, only to Cipher Suite in which all algorithms used for the encryption communication satisfy a predetermined condition (safety reference).

In the embodiment, after the encryption communication section 602 received ClientHello, the setting to inhibit use of the weak cipher is confirmed (step S802). As a result of the decision, if the setting to inhibit use of the weak cipher is valid, the process to restrict use of Cipher Suite (step S803) is executed. However, timing for executing step S803 is not limited to such timing. For example, it may be executed upon activation, of the multifunction machine 401, Cipher Suite which is restricted by step S803 may be previously and statically managed.

If the process of step S904 is executed with respect to Cipher Suite in which it has been decided that the use is not inhibited by the process of step S902 as mentioned in the embodiment, it is desirable because there is a case where step S903 in which the number of deciding processes is large can be omitted. However, the process of step S902 may be executed with respect to Cipher Suite in which it has been decided that the use is not inhibited by the process of step S904.

Figure 11:
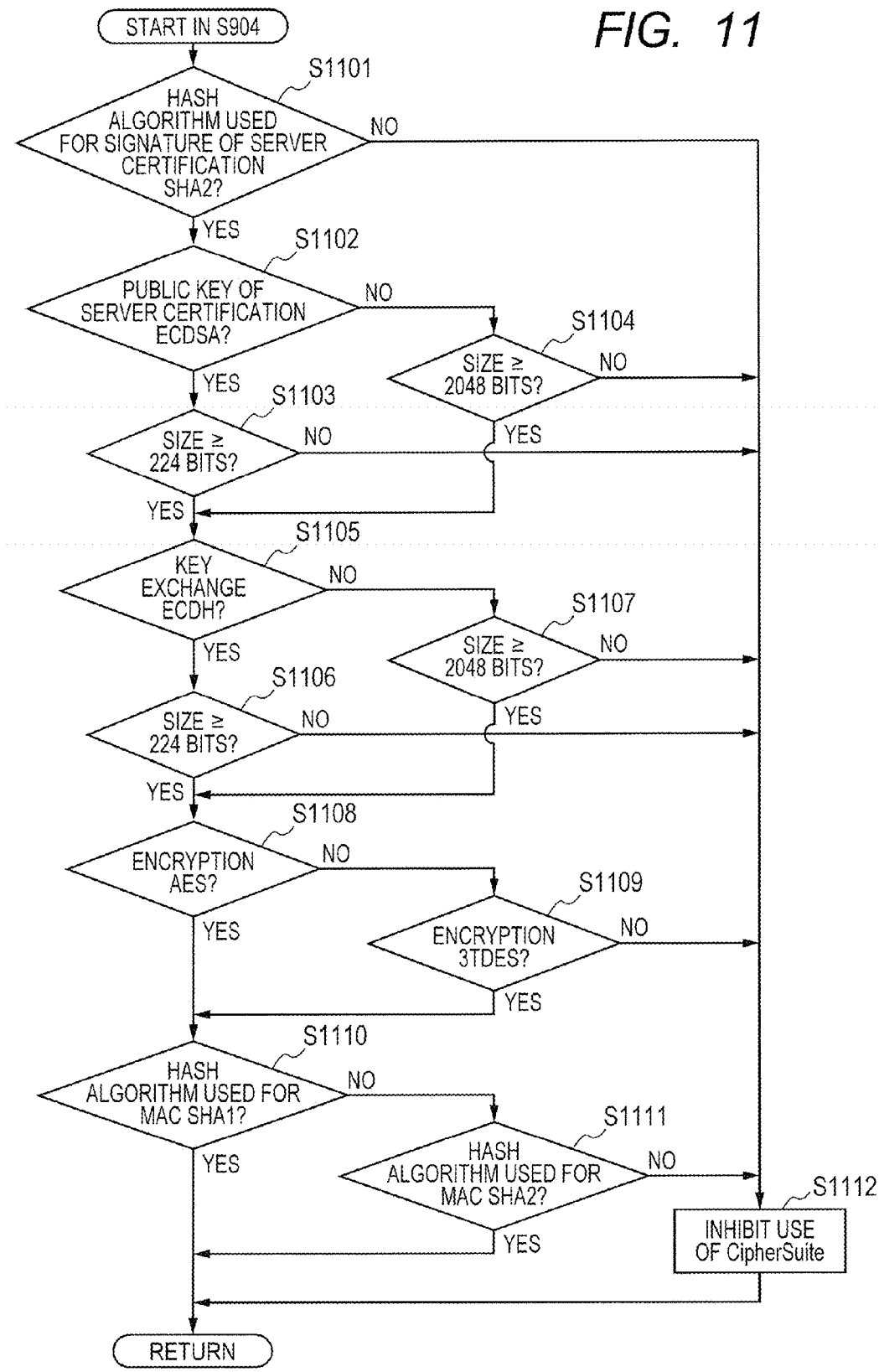
FIG. 11 is a flowchart for describing details of step S904 in FIG. 9.

In an example illustrated in FIG. 11, the algorithms constructing Cipher Suite have been selected in order of "server authentication algorithm", "key exchange algorithm", "encryption algorithm", and "hash algorithm used for calculation of MAC". However, the order adapted to select the algorithm is not limited to the order as illustrated in FIG. 11.

Second Embodiment

As mentioned above, in the first embodiment, the case where when SSL/TLS (SSL or TLS) is used, such a situation that the weak hash algorithm is used for the signature is suppressed has been described as an example. On the other hand, when SSL is used, there is a case where the MAC algorithm which is not disclosed in "Recommendation for Key Management: Part 1: General" is used. Specifically speaking, in the MAC algorithm used in the Finished message, although HMAC is used in TLS, the algorithm which is not HMAC is used in SSL. The algorithm which is not HMAC is an algorithm whose calculating method differs strictly from that of HMAC and indicates an algorithm which is not disclosed in "Recommendation for Key Management: Part 1: General". In the following description, the Finished message is abbreviated to "Finished" in accordance with necessity.

Therefore, in the embodiment, a case of controlling for preventing the MAC algorithm which is not disclosed in "Recommendation for Key Management: Part 1: General" from being used in the encryption communication will be described as an example. As mentioned above, the second embodiment is realized by adding the process for restricting use of SSL to the first embodiment. Therefore, in the description of the embodiment, substantially the same portions as those in the first embodiment are designated by the same reference numerals or signs as those in FIGS. 1 to 12B and their detailed description is omitted.

FIG. 13 is a flowchart for describing an example of the process of the multifunction machine 401.

Since processes of steps S1301 and S1302 are substantially the same as those of steps S801 and S802 in FIG. 3 described in the first embodiment, their detailed description is omitted. As a result of the decision of step S1302, if the setting to inhibit use of the weak cipher is not valid, step S1308 follows. In step S1308, the cipher control section 606 selects Cipher Suite of the highest priority in the priority order of Cipher Suites set in the multifunction machine 401, and advances to step S1306. In step S1306, the encryption communication section 602 executes the encryption communication by SSL/TLS. In this case, SSL can be used. Cipher Suite is not restricted.

On the other hand, as a result of the decision of step S1302, if the setting to inhibit use of the weak cipher is valid, step S1303 follows. In step S1303, the cipher control section 606 executes a protocol inhibiting process. In the embodiment, the cipher control section 606 inhibits use of SSL itself.

Subsequently, in step S1304, the cipher control section 606 executes an inhibiting process. In the embodiment, the cipher control section 606 executes a process for inhibiting Cipher Suite which can be used for the encryption communication by TL3. Since the process of step S1304 is substantially the same as that of step S803 (FIGS. 9 to 11) in FIG. 3 described in the first embodiment, its detailed description is omitted.

Subsequently, in step S1305, the cipher control section 606 obtains Cipher Suite whose use is permitted.

Subsequently, in step S1306, the cipher control section 606 selects Cipher Suite of the highest priority in the priority order of Cipher Suites set in the multifunction machine 401.

Subsequently, in step S1307, the encryption communication section 602 executes the encryption communication by TLS by using Cipher Suite selected in step S1306.

As mentioned above, in the embodiment, when the setting to inhibit use of the weak cipher has been applied to the multifunction machine 401, use of SSL is inhibited and, thereafter, Cipher Suite which is used in the encryption communication by TLS is restricted. Therefore, in addition to the effect described in the first embodiment, such an effect that such a situation that the weak algorithm which is not disclosed in "Recommendation for Key Management: Part 1: General" is used as a MAC algorithm used in the Finished message is suppressed is obtained.

Even in the embodiment, the modification described in the first embodiment can be applied. For example, in the embodiment, after the encryption communication section 602 received ClientHello through the network I/F 501, the setting to inhibit use of the weak cipher is confirmed (step S1302). As a result of the confirmation, if the setting to inhibit use of the weak cipher is valid, the processes for inhibiting use of SSL and restricting use of Cipher Suite (steps S1303 and S1304) are executed. However, the timing for executing steps S1303 and S1304 is not limited to such timing. For example, they may be executed upon activation of the multifunction machine 401, Cipher Suite of TLS which is restricted by step S1304 may be previously and statically managed.

As described in the embodiment, after use of SSL was inhibited in step S1303 in FIG. 13, if the process for restricting use of Cipher Suite of only TLS is executed in step S1304, since a load of the calculation can be reduced, it is desirable. However, for example, the order of step S1303 and the order of step S1304 may be reversed. In this case, in step S1304, the process for restricting use of Cipher Suites of both of SSL and TLS is executed.

Third Embodiment

In the first embodiment, the case where the server for performing the encryption communication by SSL/TLS is the multifunction machine 401 and the multifunction machine 401 controls the method of the key exchange used in Cipher Suite in accordance with the information of received ClientHello has been described as an example. On the other hand, in the embodiment, control in the case where the multifunction machine 401 is a client will be described. As mentioned above, the embodiment and the first embodiment differ mainly with respect to the construction and processes because the multifunction machine 401 is a client. Therefore, in the description of the embodiment, substantially the same portions as those in the first embodiment are designated by the same reference numerals or signs as those in FIGS. 1 to 12B and their detailed description is omitted.

Figure 14:
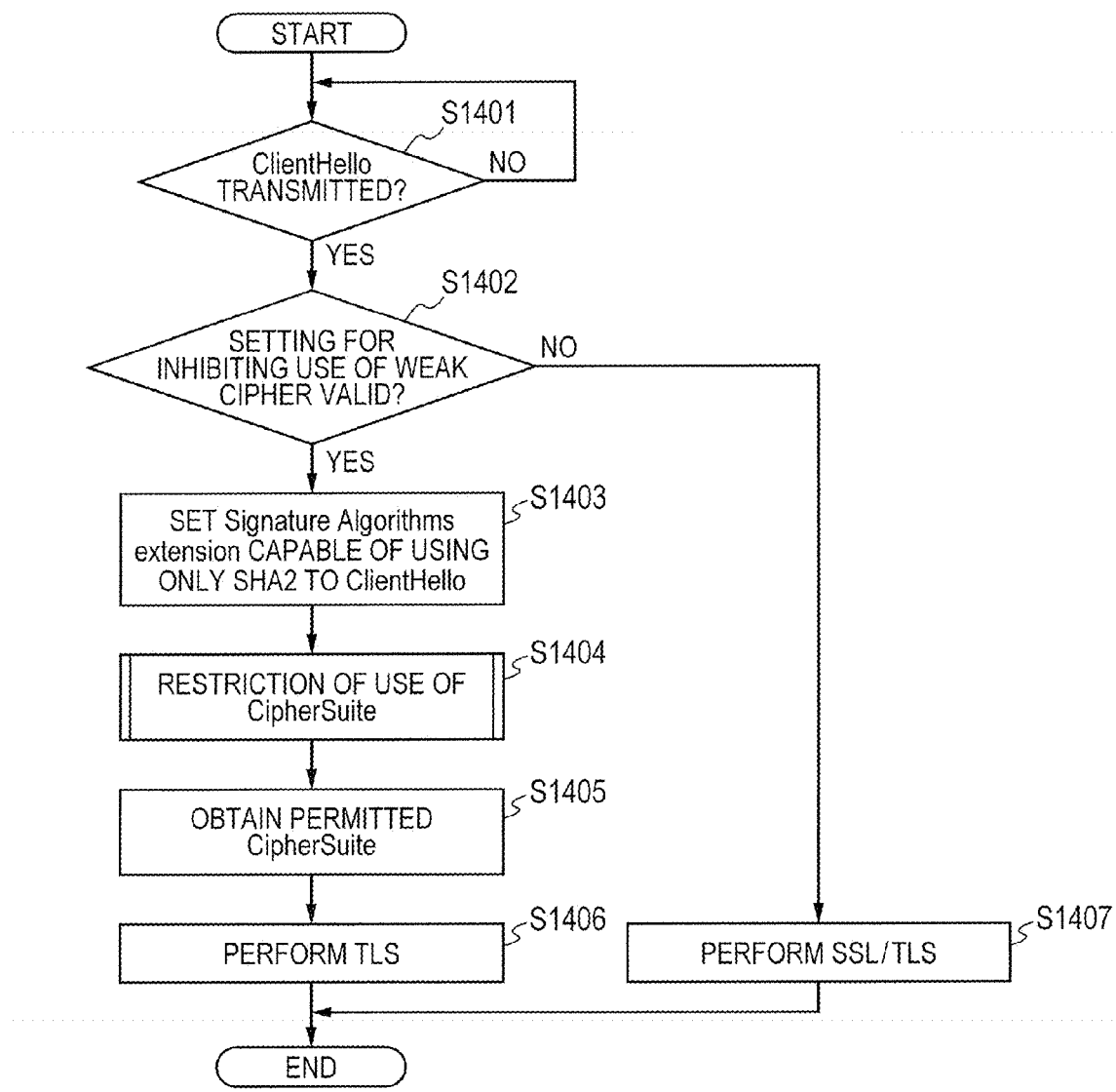
FIG. 14 is a flowchart for describing a third example of the process of the multifunction machine.

An example of control in the case where the multifunction machine 401 is a client will be described hereinbelow with reference to a flowchart of FIG. 14.

First, in step S1401, the encryption communication section 602 waits until the timing for transmitting the ClientHello message through the network I/F 501 comes.

Subsequently, in step S1402, the cipher control section 606 decides whether or not the setting to inhibit use of the weak cipher is valid, by referring to the setting values managed by the setting value management section 604.

As a result of the decision, if the setting to inhibit use of the weak cipher is not valid, step S1407 follows. In this case, the cipher control section 606 does not restrict Cipher Suite and the encryption communication protocol. In step S1407, the encryption communication section 602 executes the encryption communication by SSL/TLS.

If the setting to inhibit use of the weak cipher is valid, step S1403 follows. In step S1403, the cipher control section 606 sets Signature Algorithms extension which enables only SHA2 to be used into the ClientHello message. In step S1404, the cipher control section 606 executes the process for restricting use of Cipher Suite.

An example of the process of step S1404 (process for restricting use of Cipher Suite) will now be described with reference to a flowchart of FIG. 15.

Figure 15:
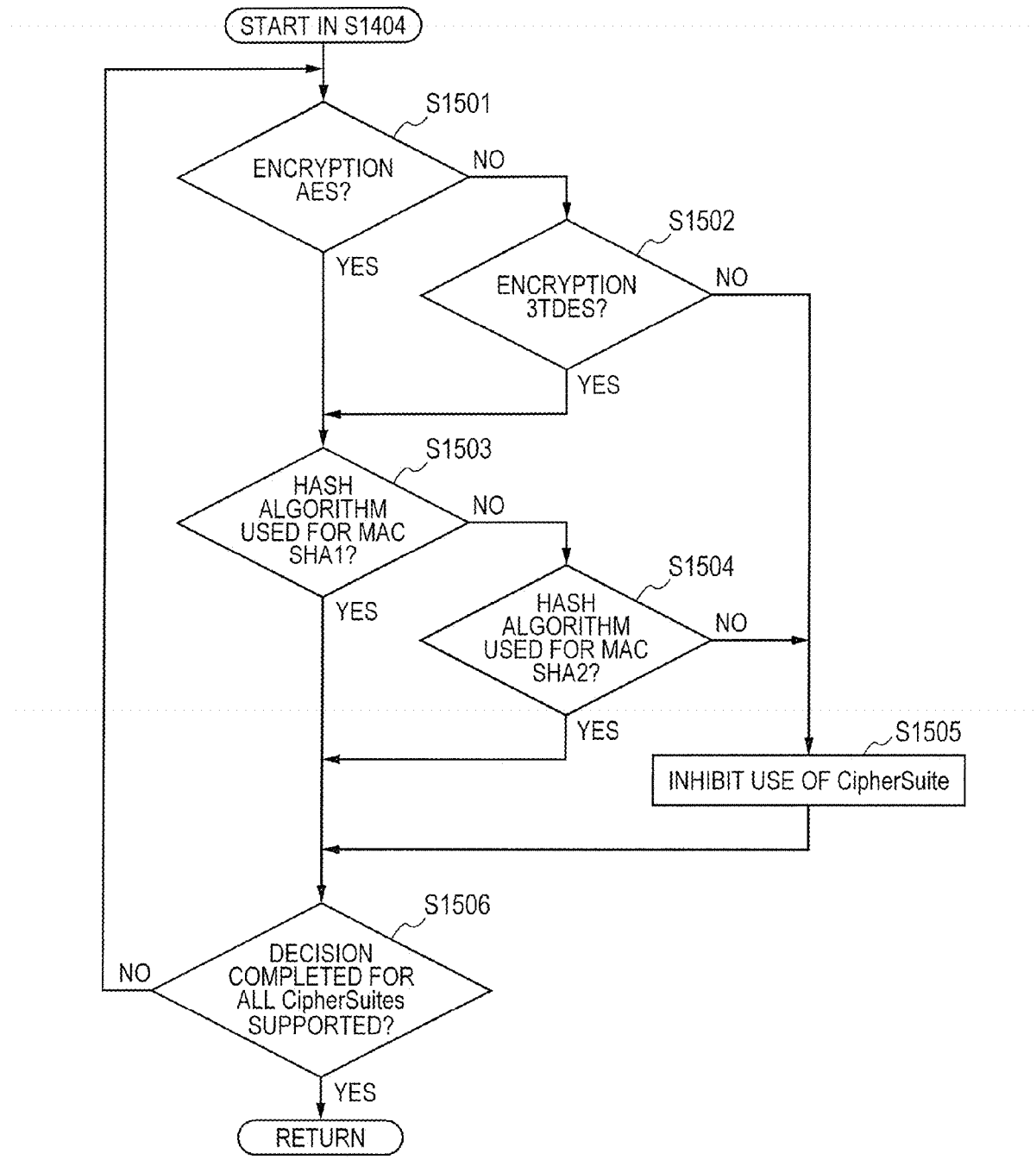
FIG. 15 is a flowchart for describing details of step S1404 in FIG. 14.

In step S1501 in FIG. 15, the cipher control section 606 decides whether or not the encryption algorithm included in Cipher Suite as a check target is AES. As a result of the decision, if the encryption algorithm is AES, the processing routine advances to step S1503, which will be described hereinafter.

On the other hand, if the encryption algorithm is not AES, step S1502 follows. In step S1502, the cipher control section 606 decides whether or not the encryption algorithm included, in Cipher Suite as a check target is 3TDES. As a result of the decision, if the encryption algorithm is not 3TDES, step S1505 follows. In step S1505, the cipher control section 606 inhibits use of Cipher Suite as a check target.

Or the other hand, if the encryption algorithm is 3TDES, step S1503 follows.

In step S1503, the cipher control section 606 decides whether or not the hash algorithm used for the calculation of MAC included in Cipher Suite as a check target is SHA1. As a result of the decision, if the hash algorithm used for the calculation of MAC is SHA1, step S1506 follows.

On the other hand, if the hash algorithm used for the calculation of MAC is not SHA1, step S1504 follows. In step S1504, the cipher control section 606 decides whether or not the hash algorithm used for the calculation of MAC included in Cipher Suite as a check target is SHA2. As a result of the decision, if the hash algorithm used for the calculation of MAC is SHA2, step S1506 follows.

On the other hand, if the hash algorithm used for the calculation, of MAC is not SHA2, step S1505 follows. In step S1505, the cipher control section 606 inhibits use of Cipher Suite as a check target. The processing routine advances to step S1506.

In step S3506, the cipher control section 606 decides the encryption algorithm to all Cipher Suites supported by the encryption communication section 602 and decides whether or not the decision about the hash algorithm used for MAC has been ended. The decision about the encryption algorithm is a decision by steps S1501 and S1502. The decision about the hash algorithm used for MAC is a decision by steps S1503 and S1504.

As a result of the decision, if the decision to all Cipher Suites is not ended yet, he foregoing processes of steps S1501 to S1505 are executed to all Cipher Suites. As order of Cipher Suites to which the processes are executed, for example, the priority order of Cipher Suites set in the multifunction machine 401 can be mentioned. However, such order is not limited to it.

As mentioned above, when the process (process of step S1404) according to the flowchart of FIG. 15 is ended as mentioned above, step S1405 follows. In step S1405, the encryption communication section 602 obtains Cipher Suite which is not subjected to the restriction of use of Cipher Suite in step S1404 (that is, use is permitted).

After that, in step S1406, the encryption communication section 602 executes the encryption communication by TLS.

As mentioned above, in the embodiment, the case where the setting to inhibit use of the weak cipher is applied to the multifunction machine 401 as a client has been described. When the multifunction machine 401 performs, as a client, the encryption communication, Signature Algorithms extension which enables only SHA2 to be used is set into the ClientHello message. Thus, even in the key exchange which needs ServerKeyExchange, the encryption communication can be performed by using the strong hash algorithm.

Even in the embodiment, the modification described in the first embodiment can be applied.

Each of the foregoing embodiments is nothing but a specific example when embodying the invention and the technical scope of the invention should not be limitedly interpreted. That is, the invention can be embodied in various forms without departing from a technical idea or principal feature of the invention.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146030, filed Jul. 16, 2014, which is hereby incorporated by reference herein in its entirety.

What is claimed is:

1. An information processing apparatus for performing encryption communication with an external apparatus in accordance with an encryption communication protocol, comprising:
a memory storing instructions; and
one or more processors that execute the stored instructions to perform the functions of:
a receiving unit configured to receive, from the external apparatus, information including strength of hash available in the external apparatus that is used to sign parameter information in a handshake process, before receiving from the external apparatus the parameter information signed with the hash in the external apparatus, wherein the parameter information is to be used for encrypted communication protocol between the information processing apparatus and the external apparatus; and
a control unit configured to control the information processing apparatus not to communicate with the external apparatus, in accordance with the encrypted communication protocol by using the parameter information signed with the hash in the external apparatus, in a case where the external apparatus does not provide the information including the strength of the hash in the external apparatus.

2. The information processing apparatus according to claim 1, wherein the one or more processors execute the stored instructions to further perform the functions of:
a decision unit configured to decide whether or not an algorithm which is used in the encryption communication protocol is an algorithm whose use is limited with respect to each of a plurality of algorithms; and
a communication unit configured to perform the handshake process and the encryption communication by using the algorithm whose use is not limited among the plurality of algorithms.

3. The information processing apparatus according to claim 2, wherein control is performed not to use an algorithm which does not satisfy a predetermined condition among the plurality of algorithms which are used in the encryption communication protocol, in accordance with a setting not to use the encryption communication of a predetermined cipher strength.

4. The information processing apparatus according to claim 2, wherein with respect to the plurality of algorithms, the decision unit decides whether or not those algorithms are an algorithm which needs to transmit a message with a signature of a server from the server to a client during the handshake process.

5. The information processing apparatus according to claim 4, wherein:
each algorithm used in the encryption communication protocol includes an algorithm for authentication of the information processing apparatus and an algorithm for exchange of the cipher key with the external apparatus; and
on the basis of a result of discrimination about a name of the algorithm for authentication of the information processing apparatus and a name of the algorithm for exchange of a cipher key with the external apparatus, the decision unit decides whether or not the algorithm used in the encryption communication protocol is an algorithm whose use is limited.

6. The information processing apparatus according to claim 2, wherein with respect to the plurality of algorithms, the decision unit further decides whether or not those algorithms satisfy a reference regarding a safety based on a cipher intensity by sequentially selecting the plurality of algorithms.

7. The information processing apparatus according to claim 6, wherein the each algorithm used in the encryption communication process includes an algorithm for authentication of the information processing apparatus, and the reference regarding the safety based on the cipher intensity includes at least one of a reference regarding a safety of a hash algorithm used for the signature to a certification of the information processing apparatus and a reference regarding a safety of a public key in the certification of the information processing apparatus.

8. The information processing apparatus according to claim 6, wherein the reference regarding the safety based on the cipher intensity includes at least one of a reference regarding a size of a cipher key which is used in the algorithms constituting the algorithm used in the encryption communication protocol and a reference regarding names of the algorithms constituting the algorithm used in the encryption communication protocol.

9. The information processing apparatus according to claim 2, wherein:
when the information processing apparatus receives, as a server, a connection request from the external apparatus as a client, the decision unit decides whether or not hash algorithms which can be used for the signature to a certification of the information processing apparatus have been presented from the external apparatus as a client; and
as a result of the decision, if it is decided that the hash algorithm which can be used for the signature to the certification of the information processing apparatus has been presented, the decision unit does not decide whether or not the algorithm used in the encryption communication protocol is the algorithm whose use is limited.

10. The information processing apparatus according to claim 9, wherein:
if it is decided that the hash algorithms which can be used for the signature to the certification of the information processing apparatus have been presented from the external apparatus as a client, the decision unit decides whether or not a hash algorithm which satisfies a predetermined cipher intensity exists in the presented hash algorithms; and
as a result of the decision, if it is decided that the hash algorithm which satisfies the predetermined cipher intensity exists, the decision unit does not decide whether or not the algorithm used in the encryption communication protocol is an algorithm whose use is limited.

11. The information processing apparatus according to claim 10, wherein if it is decided that the hash algorithm which satisfies the predetermined cipher intensity does not exist, the decision unit decides whether or not the algorithm used in the encryption communication protocol is an algorithm whose use is limited.

12. The information processing apparatus according to claim 2, wherein:
when the information processing apparatus receives, as a server, a connection request from the external apparatus as a client, the decision unit further decides whether or not hash algorithms which can be used for the signature to a certification of the information processing apparatus have been presented from the external apparatus as a client; and
as a result of the decision, if it is decided that the hash algorithms which can be used for the signature to the certification of the information processing apparatus are not presented, the decision unit decides whether or not the algorithm used in the encryption communication protocol is the algorithm whose use is limited.

13. The information processing apparatus according to claim 2, wherein the one or more processors execute the stored instructions to further perform the function of a protocol limitation unit configured to limit use of the encryption communication protocol using a predetermined algorithm among the plurality of encryption communication protocols, and
wherein the communication unit performs the encryption communication with the handshake process by using the algorithm whose use is not limited by the decision unit and the protocol limitation unit.

14. The information processing apparatus according to claim 13, wherein the decision unit decides whether or not the plurality of algorithms which are used in the encryption communication protocol whose use was not limited by the protocol limitation unit among the plurality of encryption communication protocols is the algorithm whose use is limited with respect to each of the plurality of algorithms.

15. The information processing apparatus according to claim 1, wherein:
the algorithm whose use is limited includes an algorithm which needs to transmit a message with a signature of a server from the server to a client during the handshake process; and
the algorithm whose use is permitted includes an algorithm which exchanges a cipher key by using a public key of the server during the handshake process.

16. The information processing apparatus according to claim 1, wherein the encryption communication protocol is SSL (Secure Socket Layer) or TLS (Transport Layer Security).

17. The information processing apparatus according to claim 1, wherein the parameter information is key information which is to be shared between the information processing apparatus and the external apparatus for encrypted communication protocol which uses a key exchange mechanism including at least one of an anonymous server authentication Diffie-Hellman Ephemeral (DHE), and Elliptic Curve Diffie-Hellman Ephemeral (ECDHE).

18. An encryption communicating method of performing encryption communication by an information processing apparatus and an external apparatus in accordance with an encryption communication protocol, comprising:
receiving, from the external apparatus, information including strength of hash available in the external apparatus that is used to sign parameter information in a handshake process, before receiving from the external apparatus the parameter information signed with the hash in the external apparatus, wherein the parameter information is to be used for encrypted communication protocol between the information processing apparatus and the external apparatus; and
controlling the information processing apparatus not to communicate with the external apparatus, in the encrypted communication protocol by using the parameter information, in a case where the external apparatus does not provide the information including the strength of the hash available in the external apparatus.

19. A non-transitory computer-readable storage medium which stores instructions for causing one or more processors of an information processing apparatus for performing encryption communication with an external apparatus in accordance with an encryption communication protocol to perform the functions of the following units:

a receiving unit configured to receive, from the external apparatus, information including strength of hash available in the external apparatus that is used to sign parameter information in a handshake process, before receiving from the external apparatus the parameter information signed with the hash in the external apparatus, wherein the parameter information is to be used for encrypted communication protocol between the information processing apparatus and the external apparatus; and a control unit configured to control the information processing apparatus not to communicate with the external apparatus, in accordance with the encrypted communication protocol by using the parameter information signed with the hash in the external apparatus, in a case where the external apparatus does not provide the information including the strength of the hash in the external apparatus.

\* \* \* \* \*